United States Patent

[11] 3,604,963

[72] Inventor Yasuo Tawara
 Nagoya shi, Japan
[21] Appl. No. 880,231
[22] Filed Nov. 26, 1969
[45] Patented Sept. 14, 1971
[73] Assignee Nippon Denso Kabushiki Kaisha
 Kariga-shi, Aichi-ken, Japan

[54] PREFABRICATED CONNECTOR PLATE FOR USE WITH A PLURALITY OF DIFFERENT AC TO DC GENERATOR CIRCUITS
17 Claims, 3 Drawing Figs.

[52] U.S. Cl. ............................................. 310/68,
 310/168, 320/48
[51] Int. Cl. .............................................. H02k 11/00
[50] Field of Search ............................................. 310/68,
 168; 320/48, 61, 64

[56] References Cited
UNITED STATES PATENTS

| | | | |
|---|---|---|---|
| 3,001,121 | 9/1961 | Kerr, Jr. ........................ | 310/68.4 |
| 3,094,652 | 6/1963 | Zoppi et al. ................... | 320/48 |
| 3,250,928 | 5/1966 | Bates ............................ | 310/68 |
| 3,271,601 | 9/1966 | Raver ........................... | 310/68 |
| 3,299,303 | 1/1967 | Newill et al. ................... | 310/66 |
| 3,329,841 | 7/1967 | Binder et al. .................. | 310/68 |
| 3,339,096 | 8/1967 | Heiny ........................... | 310/68 |
| 3,398,347 | 8/1968 | Citro ............................ | 320/61 |

Primary Examiner—D. F. Duggan
Assistant Examiner—John M. Gunther
Attorney—Michael S. Striker ABSTRACT: A direct-current generating arrangement in which a Y-connected alternator is connected with its output to a rectifying unit for converting the alternating current generated, into corresponding direct current. An electrically insulating plate with conductive element on its surface, is operatively connected, through these conductive elements, with the terminals of the rectifier and the output terminals of the alternator. One of the conductive elements in the form of a conductive path stretching along the electrically insulating plate, is connected to the neutral circuit point of the Y connection of the alternator. A second conductive element or path is connected with the terminal of the rectifier. Interconnecting passage elements, when not severed, lead the conductive elements or paths on the insulating plate, to form an integral structure of the conductive element, so that the network of conductive elements may be stamped from a single sheet of conductive material.

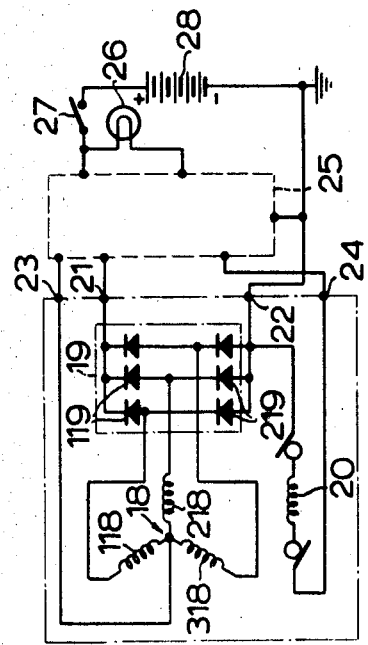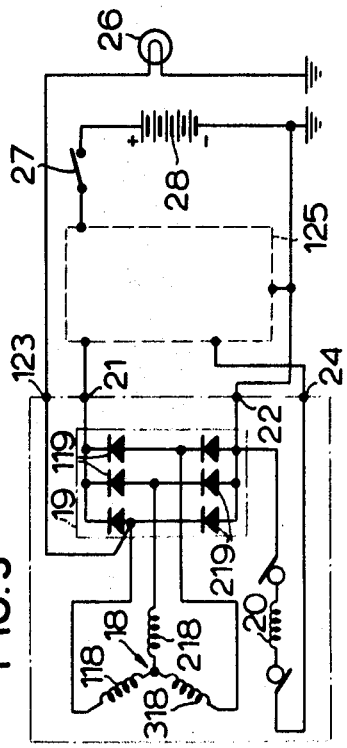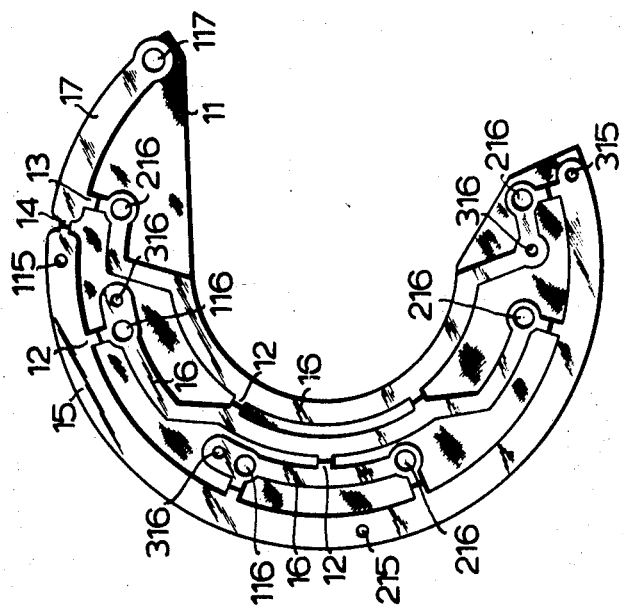
INVENTOR
Yasuo TAWARA

PREFABRICATED CONNECTOR PLATE FOR USE WITH A PLURALITY OF DIFFERENT AC TO DC GENERATOR CIRCUITS

BACKGROUND OF THE INVENTION

The present invention resides in an arrangement for producing DC current through the application of an alternating-current generator, and particularly such generators in which the stator winding is Y-connected. Rectifying elements connected to the output of the winding are insertable within the housing of the generator. The electrical terminals of the rectifying elements are at least partially connectable to an insulating member with conductive paths on a surface. The generator terminals are also electrically connected to these conductive paths on the surface of the insulating member.

Alternating-current generators for motor vehicles are conventionally in the form of three-phase generators. For purposes of rectifying the alternating current delivered by the generator, it is conventional to use six half-wave rectifying elements which are connected to the stator winding. These rectifying elements are then secured within or on the generator housing, and corresponding terminals of groups of three elements are connected together and with one conductive path.

The stator winding of the alternating-current generator is generally connected in Y-formation. In a first type of alternating-current generator, it is conventional to connect the center or common point of the Y with a voltage regulator. In a second type of alternating current generator, on the other hand, it is conventional that a charge control device be connected to the free end or terminal of one of the phases of the Y-connection. Such a charge control device may be in the form of, for example, a control lamp. In alternating-current generators of this type, separate conductive paths or elements are required for the individual phase windings of the current-producing Y-connection, as well as for the interconnections of the individual diodes of the rectifying arrangement. The fabrication of the circuitry is, thereby, exceptionally difficult, and the arrangement of the conductive paths in the conductive system is very complex—a situation which often leads to disturbing problems.

In the past, wires for the conductive paths were used, and an improvement was realized with the use of circuit plates or printed circuitry in which the electrical connections between the terminals of the diodes were produced through printed conductive paths on nonconducting plates or substrates. However, even with such design, the fabrication of the circuitry is still very complex in many locations, and the complex arrangements lead easily to operating problems. This also applied to the situation when the rectifying arrangement is a single element.

If, however, a circuit plate is to be produced for both of the alternating-current generator types described above, three operating processes are required. In one process, the conductive member of which the individual conductive paths are formed, must be stamped from a single electrically conducting sheet. In the second operating process, the stamped-out conductive member is arranged on a conventional plate-shaped insulating member. In the third operating process, the individual conductive paths are separated from each other, as required, through cutting or severing the conductive member at the proper locations. Should it be required to produce such conductive plates for both types of alternating-current generators, then two types of dies and tools are required for each one of the preceding operating processes. Accordingly, the complexity of the equipment and the preparation for the manufacture is exceptionally large and undesirable.

Accordingly, it is an object of the present invention to avoid the disadvantages described above. It is the object of the present invention that the isolating member or insulating member has at least one conductive path to the common circuit point or center of the Y-connection of the generator winding, and at least one conductive path to the terminals of the rectifying elements. At least one further conductive path is provided for auxiliary connections, and these conductive paths are formed from a single piece through interconnecting elements. The arrangement is such that the insulating member with the conductive path is adaptable for a number of different types of alternating-current generators.

A particularly advantageous result is realized when the interconnecting elements are severed between the conductive path for the common point or center point of the Y and the conductive path for the rectifying terminals. At the same time, the interconnecting elements are severed between the conductive path for the rectifying elements and the conductive path for the auxiliary terminals. The interconnecting elements, furthermore, between the conductive paths for the center or common point of the Y and the conductive paths for the auxiliary terminals are also severed. In this manner, the insulating member with the conductive paths can be used for either the first type of alternating-current generator, or for the second type thereof.

SUMMARY OF THE INVENTION

A direct-current generating arrangement for the charging of batteries in motor vehicles, in which a Y-connected alternating-current generator has its output terminals connected to a rectifying arrangement. The latter converts the alternating current into direct current suitable for charging the battery of a motor vehicle. An electrically insulating member with a multiplicity of conductive elements establishes electrical connections with the terminals of the rectifying arrangement and the alternating-current generator, through these conductive elements. One of these conductive elements on the electrically insulating member is connected to the neutral circuit point of the Y-connection which is preferably on the stator of the generator. Another conductive element or conductive path is connected with the terminals of the rectifier which is comprised of a multiplicity of diodes. Interconnecting passage elements link the conductive elements or conductive paths on the insulating member, so that the network of paths may be fabricated from a single sheet of conductive material. For using the insulating member in conjunction with one type of alternating-current generator, predetermined ones of these interconnecting passage elements are severed, whereas other predetermined ones of these interconnecting passage elements are severed when using the insulating member with another type of alternating-current generator. In one type of alternating-current generator, a voltage regulator is connected to the neutral circuit point of the Y-connection. In the other type of alternating-current generator, a charging control device in the form of a control lamp is connected to one of the phases of the Y-connection. The insulating member is a plate-shaped member, and the conductive elements are situated on the surface of the insulating member and stretch along predetermined paths thereof. The rectifying elements are insertable within the generator housing.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a plan view of an insulating substrate member with different conductive elements situated thereon, in accordance with the present invention;

FIG. 2 is an electrical schematic diagram of a first type of alternating-current generator used in conjunction with the arrangement of FIG. 1; and FIG. 3 is an electrical schematic diagram of a second type of alternating-current generator used in conjunction with the arrangement of FIG. 1, in accordance with the present invention.

DESCRIPTION OF THE PREFERRED EMBODIMENTS

Referring to the drawing, and in particular to FIG. 1, a plate-shaped insulating member 11 possesses short circuit elements 12, 13 and 14 connected to one another with conductive elements in the form of the star conductor point 15, the diode connection 16 and the auxiliary connection 17. Cutouts 115, 215 and 315 are provided in the star point conductor 15. Into these cutouts are inserted the ends or terminals of the individual phases which form the star point or Y-circuit connection. These individual coil phases of the Y-circuit connection are denoted by 118, 218 and 318 in FIG. 2, and the current-producing winding of the Y-connection is denoted by 18 in FIG. 2. In the above-mentioned conductor path 16, cutouts 116 and 117 are provided, and the terminals of the full-wave rectifier arrangement 19, in FIG. 2, are inserted into these cutouts. This full-wave rectifier arrangement 19 consists of three-phase forming positive diodes 119 and negative diodes 219. Cutouts 316 are, furthermore, provided in the connection between the diode terminals for which the conductive path 16 serves. Inserted into these cutouts 316, are inserted the terminals of the individual phase coils or windings 118, 218 and 318 of the current-producing winding 18 in the form of a Y-arrangement. The circuit plate shown in FIG. 1 in accordance with the present invention, is made of electrically conductive sheet metal as, for example, iron or copper. This circuit plate may be stamped to provide its shape, and then be pressed into an insulating member 11. At the same time, the stamped-out sheet metal may be inserted into the insulating member 11 and then secured therein. In the bridges 12, 13 and 14, already mentioned above, notches or grooves are provided so that these bridges may be easily separated mechanically and electrically.

If the bridges 12 and 13 are severed, the electrical connection between the Y-conductive path 15 and the rectifying conductive path 16 become interrupted. Such interruption also applies to the connecting path between the individual elements of the rectifying conductive path 16, which serve for connecting the individual rectifying or rectifier terminals with one another. The interruption in circuit connection also applies to the connecting path between the auxiliary path 17 and the individual parts of the rectifier conductive path 16. With the preceding design and arrangement, the circuit plate of the present invention is adaptable for use for a generator as described below in relation to FIG. 2.

When the bridges 12 and 14 are, on the other hand, severed, the electrical connections between the Y-conductive path 15 and the rectifying path, becomes severed. This condition also applies to the connections between the individual parts or elements of the rectifier path 16, which serve to interconnect the rectifier terminals. The bridge between the auxiliary conductive path 17 and the Y-conductive path 15 is also electrically severed. Through this arrangement, the circuit plate, in accordance with the present invention, may be used for a generator as described below in relation to FIG. 3.

FIG. 2 shows a first embodiment of an alternating-current generator as conventionally used for motor vehicles. The individual coil or winding elements 118, 218 and 318 of the current-producing winding 18 are connected in a Y-circuit. The common junction to which the three phases of the Y are connected, is brought out to a terminal 23. The free ends of the winding 18 are connected to full-wave rectifier arrangement 19. The cathodes of the three positive diodes 119 are connected together and to a positive terminal 21. The anodes of the three negative diodes 219, on the other hand, are connected together and to a negative terminal 22. Also connected to the minus or negative terminal 22, is also one end or terminal of the excitation winding 20 which is mounted upon the rotor of the generator. The other end or terminal of the excitation winding 20, on the other hand, leads to a terminal 24. The four terminals 21, 22, 23 and 24 of the generator, are connected to corresponding terminals of a voltage regulator 25. A charging control lamp 26 is connected to the voltage regulator 25. With the aid of an ignition switch 27, the voltage regulator may be disconnected from the positive terminal of a battery 28 built into the motor vehicle. The negative terminal of the motor vehicle battery 28 is connected to the chassis of the motor vehicle, as is the negative terminal 22 of the generator.

FIG. 3 shows a second embodiment of a conventional alternating-current generator. Elements in FIG. 3 which are identical to those in FIG. 2, are designated by the same reference numeral. The common junction or center connection of the Y-winding 18 is not brought out in this arrangement of FIG. 3. However, the terminal of one of the phases is connected to an output terminal 123. A charge control lamp 26 is connected between this terminal 123 and ground potential.

The insulating member of the present invention with the conductive paths has the advantage that at least two different types of alternating-current generators may be used. The arrangement is such that individual electrical connections between the conductive paths are interrupted. As a result, it is possible to standardize beforehand the structural parts and to enter into manufacture rationally. The complexity for the fabrication of two different types of circuit plate, as combinations of insulating members with conductive paths, is consequently readily accomplished. This occurs from the condition that the different circuit plate for two different types of generators, as shown in FIGS. 2 and 3, need not be fabricated in any particular manner. The necessary tools and dies for the stamping operation can be used repeatedly in both cases. Only a single final operation is required, namely that of producing a circuit plate for a first type of generator or a second type of alternating-current generator.

It will be understood that each of the elements described above, or two or more together, may also find a useful application in other types of constructions differing from the types described above.

While the invention has been illustrated and described as embodied in a direct current generating arrangement, it is not intended to be limited to the details shown, since various modifications and structural changes may be made without departing in any way from the spirit of the present invention.

What is claimed as new and desired to be protected by Letters Patent is set forth in the appended claims.

1. A direct-current-generating arrangement comprising, in combination, an electric circuit including alternating Y-connected current-generating means, rectifying means, and an electrically insulating member with conductive elements, said conductive elements including at least one first conductor means for connection to the neutral terminals of the phase windings of the Y, at least one second conductor means for connection to the rectifying components of the circuit, at least one third conductor means for connection to any other component of the circuit, and a plurality of electrically conductive bridging elements interconnecting said conductor means to form a unitary said conductive elements that can be used with a plurality of different circuits for establishing the electrical paths between the components of the circuit used simply by breaking the required said bridging elements so as to disconnect the corresponding said conductor means as required by the particular said circuit.

2. The direct-current-generating arrangement as defined in claim 1 wherein said conductive elements are on the surface of said electrically insulating member.

3. The direct-current-generating arrangement as defined in claim 1 wherein said insulating member is plate shaped.

4. The arrangement as defined in claim 1, wherein said bridging elements interconnect said first and second, second and third, and first and third conductor means.

5. The arrangement as defined in claim 4, wherein said rectifying means is located within the housing of said alternating-current-generating means.

6. The arrangement as defined in claim 4, wherein said bridging elements between said first and second and between said second and third conductor means are broken for a first type of circuit.

7. The arrangement as defined in claim 4, wherein said bridging elements between said first and third conductor means are broken for a second type of circuit.

8. The arrangement as defined in claim 6, wherein said first type of circuit includes a voltage regulator, and said neutral point of the Y is connected to said voltage regulator.

9. The arrangement as defined in claim 7, wherein said second type of circuit includes a charging indicator, and the end of a phase winding remote from said neutral point of the Y is connected to said indicator.

10. A prefabricated arrangement usable with a plurality of different alternating current, Y-connected, electric generating circuits with rectification for establishing the electrical paths between the components of the circuit used, comprising, in combination, an electrically insulating member; laminar electric conductor means on said member for connection to the components of the electric circuit, and laminar conductor means including at least one first conductor means for connection to the neutral terminals of the phase windings of the Y, at least one second conductor means for connection to the rectifying components of the circuit, at least one third conductor means for connection to any other components of the circuit, and a plurality of electrically conductive bridging elements interconnecting said conductor means so as to form a unitary said laminar electric conductor means that can be used with a plurality of different circuits for establishing the electrical paths between the components of the circuit used simply by breaking the required said bridging elements so as to disconnect the corresponding said conductor means as required by the particular said circuit.

11. The arrangement as defined in claim 10, wherein said bridging elements interconnect said first and second, second and third, and first and third conductor means.

12. The arrangement as defined in claim 11, wherein said bridging elements between said first and second and between said second and third conductor means are broken for a first type of circuit.

13. The arrangement as defined in claim 11, wherein said bridging elements between said first and third conductor means are broken for a second type of circuit.

14. The arrangement as defined in claim 12, wherein said first type of circuit includes a voltage regulator, and said neutral point of the Y is connected to said voltage regulator.

15. The arrangement as defined in claim 13, wherein said second type of circuit includes a charging indicator, and the end of a phase winding remote from said neutral point of the Y is connected to said indicator.

16. The arrangement as defined in claim 10, wherein said first, second, and third conductor means are on the surface of said insulating member.

17. The arrangement as defined in claim 10, wherein said insulating member is plate shaped.